(12) United States Patent
Lee

(10) Patent No.: US 9,981,838 B2
(45) Date of Patent: May 29, 2018

(54) DRINKING WATER SUPPLY DEVICE

(71) Applicant: LG ELECTRONICS INC., Seoul (KR)

(72) Inventor: Jaebaek Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 15/180,469

(22) Filed: Jun. 13, 2016

(65) Prior Publication Data

US 2017/0057802 A1 Mar. 2, 2017

(30) Foreign Application Priority Data

Aug. 28, 2015 (KR) .................. 10-2015-0121659

(51) Int. Cl.
*B67D 1/00* (2006.01)
*B67D 1/14* (2006.01)
(Continued)

(52) U.S. Cl.
CPC ......... *B67D 1/0085* (2013.01); *B67D 1/0888* (2013.01); *B67D 1/1466* (2013.01);
(Continued)

(58) Field of Classification Search
CPC ... B67D 1/0085; B67D 1/0888; B67D 1/1466
(Continued)

(56) References Cited

U.S. PATENT DOCUMENTS 3,934,757 A * 1/1976 Malek .................... B67D 1/124
141/362
4,210,262 A * 7/1980 Donaldson ............... B67D 3/02
141/362
(Continued)

FOREIGN PATENT DOCUMENTS

KR 10-1995-0053437 1/1999
KR 10-2007-0066297 6/2007
(Continued)

OTHER PUBLICATIONS

Korean Office Action dated Oct. 20, 2016 issued in Application No. 10-2015-0121659.
(Continued)

*Primary Examiner* — Timothy L Maust
(74) *Attorney, Agent, or Firm* — KED & Associates, LLP

(57) ABSTRACT

A drinking water supply device configured to discharge water based on a pressure of water supplied from a water supply source is provided. The drinking water supply device may include at least one discharge flow path that allows water supplied from the water supply source to flow therein, a discharge valve provided in the at least one discharge flow path, at least one cock provided in an end of the at least one discharge valve, the discharge valve including a sensor that generates a discharge signal to open the at least one discharge valve, a lever coupled to the at least one cock and operated by pushing and pulling, and a controller that controls the at least one discharge valve and the sensor. The
(Continued)

discharge signal may be generated in the sensor when a switch of the sensor is pressed by a predetermined region of the lever.

20 Claims, 10 Drawing Sheets

(51) Int. Cl.
  *B67D 1/08* (2006.01)
  *C02F 1/00* (2006.01)
(52) U.S. Cl.
  CPC .......... *B67D 1/0009* (2013.01); *B67D 1/0014* (2013.01); *B67D 1/0895* (2013.01); *B67D 2001/0089* (2013.01); *B67D 2001/0094* (2013.01); *B67D 2210/0001* (2013.01); *B67D 2210/00036* (2013.01); *C02F 1/001* (2013.01); *C02F 2307/10* (2013.01)
(58) Field of Classification Search
  USPC .......................................... 141/351, 360–362
  See application file for complete search history.

(56) References Cited

U.S. PATENT DOCUMENTS

| | | | | |
|---|---|---|---|---|
| 4,915,261 A * | 4/1990 | Strenger | ............... | A47J 31/407 222/107 |
| 5,129,434 A * | 7/1992 | Whigham | ............ | B67D 1/0037 141/362 |
| 5,181,631 A * | 1/1993 | Credle, Jr. | ............ | B67D 1/0027 141/362 |
| 5,228,486 A * | 7/1993 | Henninger | ............ | B67D 1/1238 141/1 |
| 5,788,840 A * | 8/1998 | Lee | .................. | A47J 31/46 137/801 |
| 6,871,675 B1 * | 3/2005 | Marszalec | .............. | B67D 1/001 141/82 |
| 7,171,993 B2 * | 2/2007 | Bethuy | ................ | B67D 1/0888 137/392 |
| 8,413,460 B2 * | 4/2013 | Yang | .................... | F25D 23/126 62/389 |
| 8,657,161 B2 * | 2/2014 | Tavolazzi | ............. | B67D 1/0004 137/386 |
| 9,334,149 B2 * | 5/2016 | Dorney | ............... | A47G 19/2227 |
| 9,581,382 B2 * | 2/2017 | Yang | ........................ | F25C 5/005 |
| 9,624,086 B2 * | 4/2017 | Banning | ................. | B67D 3/04 |

FOREIGN PATENT DOCUMENTS

| KR | 20-2015-0000752 | 2/2015 |
|---|---|---|
| KR | 10-2015-0058731 | 5/2015 |

OTHER PUBLICATIONS

Korean Notice of Allowance dated Apr. 21, 2017 issued in Application No. 10-2015-0121659 (English translation attached).

\* cited by examiner

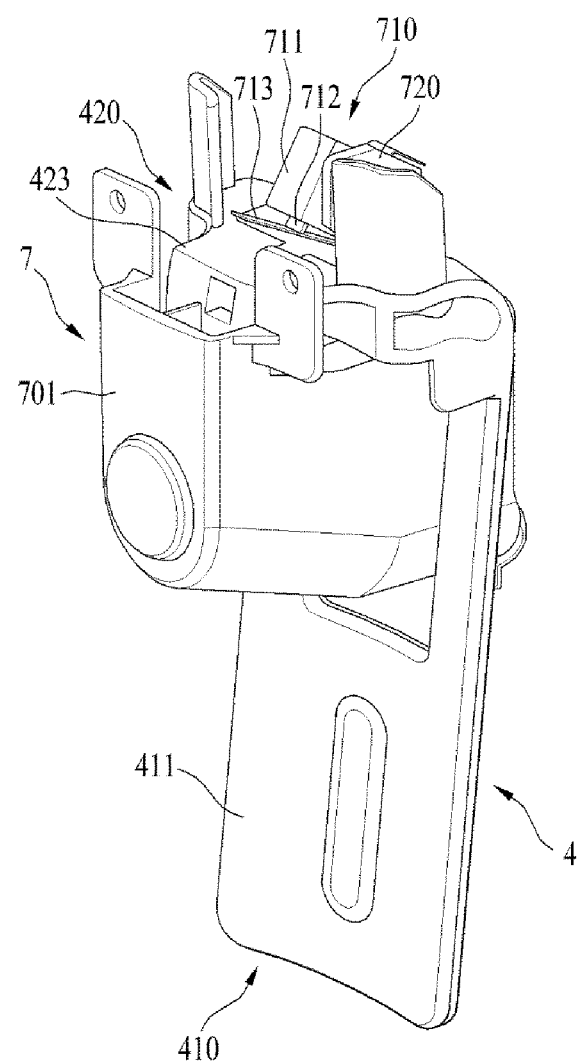

DRINKING WATER SUPPLY DEVICE

CROSS-REFERENCE TO RELATED APPLICATION

This application claims priority under 35 U.S.C. § 119 to Korean Application No. 10-2015-0121659 filed on Aug. 28, 2015, whose entire disclosure is incorporated herein by reference.

BACKGROUND

1. Field

Embodiments relate to a drinking water supply device.

2. Background

A drinking water supply device may be configured to supply drinking water to users and may be an independent device or a component of an electric home appliance, such as, e.g., a refrigerator. The drinking water supply device may supply not only ambient temperature drinking water but also cold water or hot water via cooling or heating drinking water flowing in the drinking water supply device. The drinking water may be underground water or raw water supplied from a hydrant or a water supply source, or the drinking water may be purified water purified by filtering raw water.

The drinking water supply device may be a storage type drinking water supply device or a direct supply type drinking water device. In the storage type drinking water supply device, raw water or purified water may be stored in a tank and discharged from the tank according to a user's discharge command. In the direct type drinking water supply device, drinking water may be directly supplied to the user according to the user's command, without having a water tank as in the storage type drinking water supply device. For example, the direct type drinking water supply device may control drinking water to be supplied by pressure of the water supplied from a water supply source or by pressure of the water reduced by a pressure reducing valve.

To discharge drinking water, the user may manipulate a discharge lever provided in the drinking water supply device. The discharge lever may include a mechanical discharge lever or an electric discharge lever. The mechanical discharge lever may be configured to open and close a drinking water outlet hole using a force of a spring provided between a cock and a discharge lever. The electric discharge lever may be configured to open and close a valve provided in a drinking water outlet line or a drinking water inlet line according to an operation of a sensor.

The mechanical discharge lever may have a limited restitution of a spring installed between the discharge lever and the cock, so that it may be difficult to apply the mechanical discharge lever to the direct type drinking water supply device having a relatively strong water pressure. Accordingly, the electric discharge lever may be provided in the direct type drinking water supply device and may have a function of discharging drinking water by using a pulling force or a pushing force.

Technical advantages of the mechanical discharge lever, which may discharge drinking water through the pulling force, may be difficult to apply to the electric discharge lever provided in the direct type drinking water supply device mentioned above. The electric discharge lever may have to be continuously pushed so as to keep discharging drinking water continuously. The electric discharge lever may also need to have several sensors so as to discharge drinking water.

BRIEF DESCRIPTION OF THE DRAWINGS

The embodiments will be described in detail with reference to the following drawings in which like reference numerals refer to like elements wherein:

FIG. 4A is a perspective view of a structure configured with a cock and a lever provided in the drinking water supply device in accordance with an embodiment;

DETAILED DESCRIPTION

In the following description, raw water may refer to water before passing through a filter and purified water may refer to water filtered while passing a filter. Cold water may refer to water cooled in a cold water tank, and hot water may refer to the water heated in a hot water tank. For the sake of brief description, raw water, purified water, cold water and hot water may refer to drinking water. A front end and a rear end may refer to an upper region and a lower region of water flow with respect to a forward flow direction.

Figure 1:
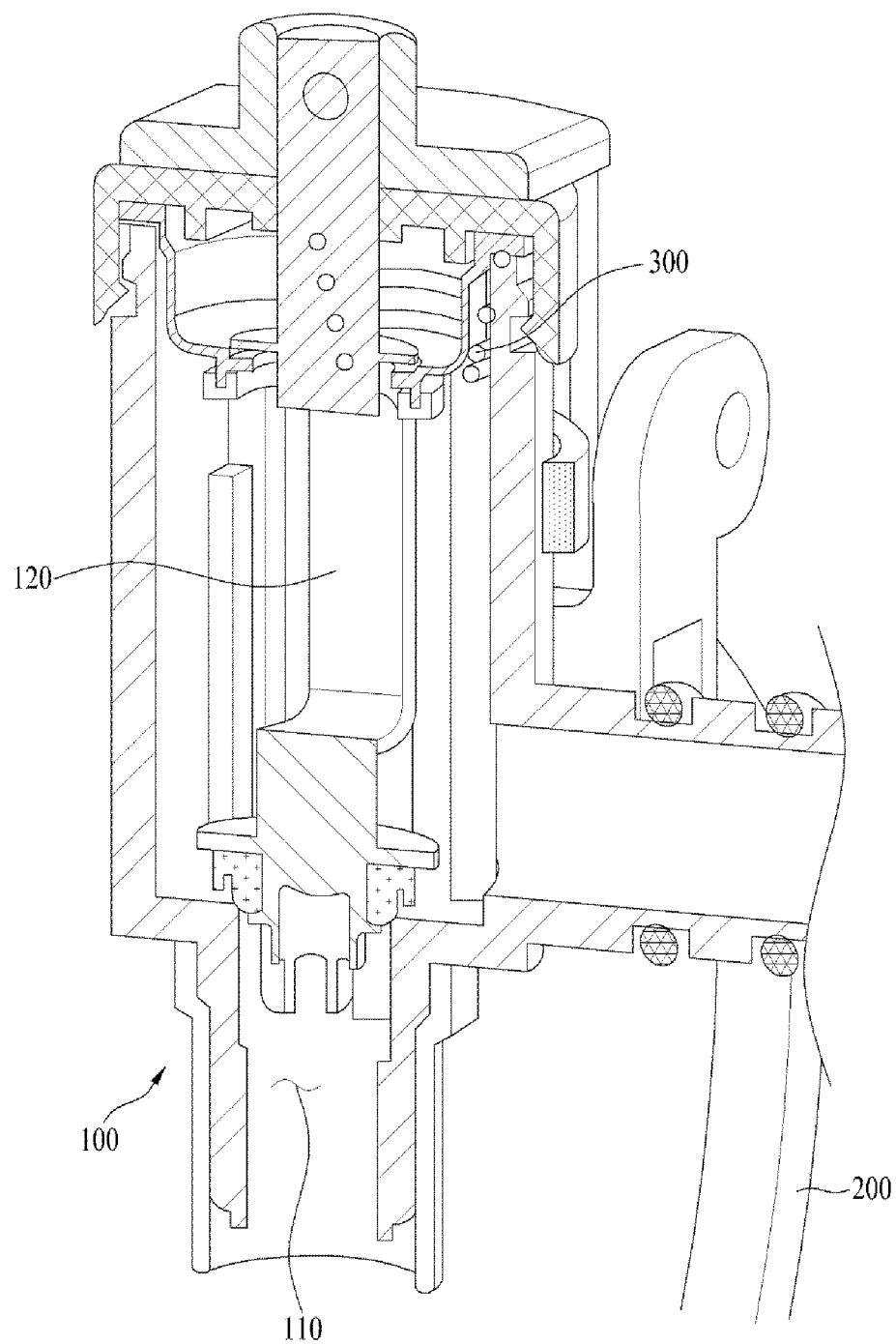
FIG. 1 is a sectional view of a structure having a mechanical cock and a mechanical lever.

Referring to FIG. 1, a storage drinking water supply device may include a cock 100 to discharge drinking water and a discharge lever 200 that allows the cock 100 to discharge drinking water according to a user's manipulation. A side of the discharge lever 200 may be supported by a spring 300 provided in the cock 100. An opening/closing rod 120 may be provided in the cock 100 to open and close a discharge hole 110 formed in a lower portion of the cock based on operation of the discharge lever 200. When the user pushes or pulls the discharge lever 200, the opening/closing rod 120 may open the discharge hole 110. The spring 300 may be configured to apply a restitution force to the opening/closing rod 120 and the discharge lever 200.

If a spring 300 having a relatively weak restitution force is installed between the discharge lever 200 and the cock 100, the user's manipulation of the discharge lever 200 may be facilitated but water leakage may occur. In contrast, if a spring 300 having a relatively strong restitution force is installed between the discharge lever 200 and the cock 100, water leakage may be prevented to some degree but it may be difficult or impossible for the user to manipulate the discharge lever 200 with such a spring having a relatively strong restitution.

Figure 2:
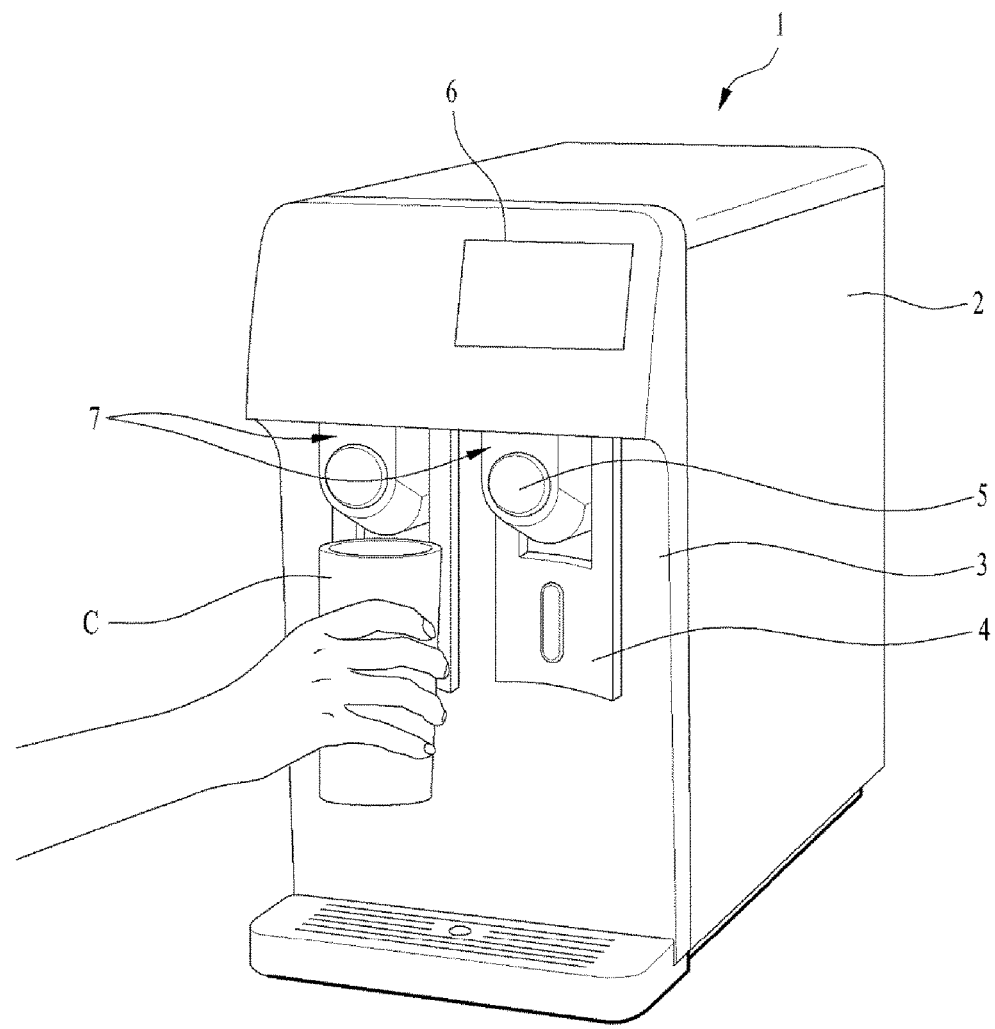
FIG. 2 is a perspective view of a drinking water supply device in accordance with an embodiment.

Referring to FIG. 2, a drinking water supply device 1 according to an embodiment may include a cabinet 2 that defines an exterior appearance and a dispenser 3. The dispenser 3 may be a space where a user may be provided with drinking water, and the dispenser 3 may be formed in a front side of the cabinet 2. A cock 7 may be provided in the dispenser 3 to allow drinking water discharged there through.

A real-time control input 4 and a safety button 5 may be provided in the dispenser 3 to be manipulated by the user so as to discharge drinking water. The real-time control input 4 may be a discharge lever. The safety button 5 may be configured to be pressed by the user when hot water is discharged. When the user presses the safety button 5 after manipulating the real-time control input 4 to discharge hot water, hot water may be discharged via the cock 7, and the user may be prevented from getting scalded with hot water.

To discharge drinking water, the user may push or pull a discharge lever that corresponds to the real-time control input 4. For example, the user may fill a cup (C) placed under the cock 7 with the drinking water discharged from the cock 7 while pushing or pulling the lever. The drinking water supply device 1 may control drinking water to be discharged via the cock 7 based on when the user is pushing or pulling the lever. The drinking water supply device 1 may include a display 6. Information on drinking water may be displayed on the display 6. Examples of displayed information may include temperatures of cold water and hot water. The display 6 may recognize touch inputs. Accordingly, the user may select one or more of purified, hot and cold water by touching the display 6.

As illustrated in FIG. 1, two cocks 7 may be provided, and the two cocks 7 may include one cock to discharge cold water and purified water and another one to discharge hot water. As another example, three cocks 7 may be provided to discharge purified water, hot water and cold water, respectively, or one cock may be provided to discharge cold water, purified water and hot water.

Figure 3:
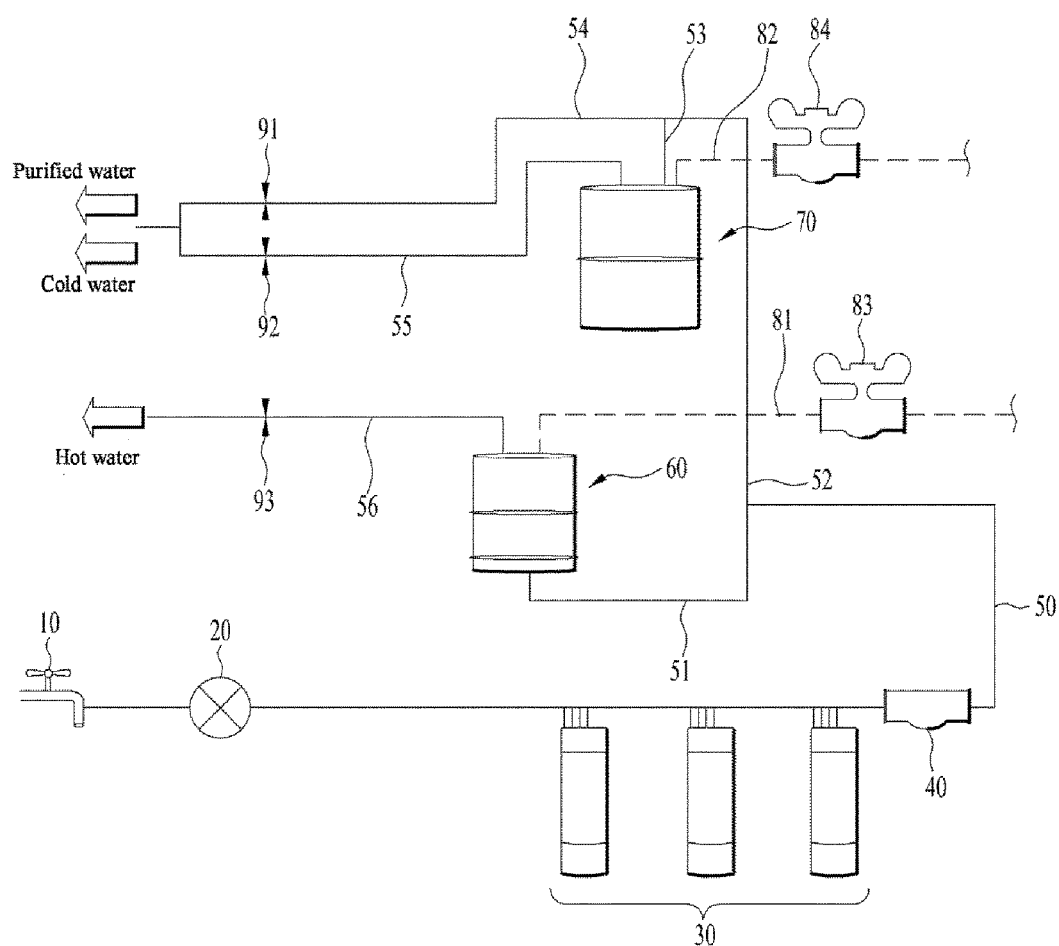
FIG. 3 is a conceptual diagram of a structure and a pipe of the drinking water supply device in accordance with an embodiment.

Referring to FIG. 3, the drinking water supply device 1 may be provided as a direct type drinking water supply device configured to discharge drinking water based on a pressure of water supplied from a water supply source 10. The pressure of the water supplied from the water supply source 10 may be the pressure of the water from the water supply source 10 or the pressure of the water reduced by a pressure reduction valve 20 after the water is supplied from the water supply source 10.

The drinking water supply device 1 may include a hot water tank 60 having a heater heating the water supplied from the water supply source 10 and a cold water tank 70 having a cooler cooling the water supplied from the water supply source 10. The water from the water supply source 10 may be supplied to the hot water tank 60 and the cold water tank 70 via a supply flow path 50 from the water supply source 10.

One or more filters 30 may be provided in the supply flow path 50 and the water supplied from the water supply source 10 may be purified while passing through the filter 30. A supply valve 40 may be provided in the supply flow path 50, for example, at a lower region or a rear end of the filter 30. The supply valve 40 may be selectively opened based on a drinking water discharge signal input by the user.

The supply flow path 50 may be branched into a first flow path 51 and a second flow path 52 from the rear end of the supply valve 40. The first flow path 51 may be formed toward the hot water tank 60 and the second flow path 52 may be formed toward the cold water tank 70. The drinking water flowing along the first flow path 51 branched from the supply flow path 50 may flow into the hot water tank 60. The second flow path 52 may be branched into a third flow path 53 formed toward the cold water tank 70 and a fourth flow path 54 formed toward the cock 7 mentioned above. Accordingly, the drinking water flowing along the third flow path 53 branched from the second flow path 52 may flow into the cold water tank 70. The drinking water flowing along the fourth flow path 54 branched from the second flow path 52 may be discharged via the cock 7 based on the discharge signal input by the user.

Once a cold water discharge signal is input, the water supplied from the water supply source 10 may flow into the cold water tank 70 after flowing along the supply flow path, the second flow path 52 and the third flow path 53, sequentially. The water or cold water inside the cold water tank 70 may be discharged through the cock 7 after flowing along a fifth flow path 55 connected to the cold water tank 70. Once a hot water discharge signal is input, the water supplied from the water supply source 10 may flow into the hot water tank 60 after flowing along the supply flow path 50 and the first flow path 51, sequentially. The water or hot water inside the hot water tank 60 may be discharged via the cock 7 after flowing along a sixth flow path 56 connected to the hot water tank 70.

The fourth, fifth and sixth flow paths 54, 55, and 56 mentioned above may refer to discharge flow paths. The drinking water supply device 1 in accordance with an embodiment may include one or more discharge flow paths 54, 55, and 56 formed to allow the drinking water supplied from the water supply source to flow there along. One or more discharge valves 91, 92, and 93 may be provided in the discharge flow paths 54, 55, and 56, respectively. The discharge valves 91, 92 and 93 may be provided in the fourth flow path 54, the fifth flow path 55 and the sixth flow path 56, respectively. Based on a discharge signal input, the discharge valves 91, 92 and 93 may be selectively opened and closed by a controller (C). The discharge valves 91, 92 and 93 may be solenoid valves.

The cock 7 shown in FIG. 1 may include three cocks provided in outlet ends of the fourth, fifth and sixth flow paths 54, 55 and 56, respectively. As an alternative example, one cock may be provided by combining outlet ends of the fourth, fifth and sixth flow paths, or one cock may be provided in outlet ends of the fourth and fifth flow paths 54 and 55 to discharge cold water and purified water and another cock may be provided in an outlet end to discharge hot water.

Ventilation paths 81 and 82 to discharge internal air outside may be connected to the hot water tank 60 and the cold water tank 70, respectively. The ventilation paths 81 and 82 may include a first ventilation path 81 connected to the hot water tank 60 and a second ventilation path 82 connected to the cold water tank 70. A first ventilation valve 83 may be provided in the first ventilation path 81, and a second ventilation valve 84 may be provided in the second ventilation path 82. The first ventilation valve 83 and the second ventilation valve 84 may be opened selectively when water is filled in the hot water tank 60 and the cold water tank 70. For example, when the drinking water supply device 1 is installed, internal air of the hot water tank 60 and the cold water tank 70 may be discharged outside and water can be supplied to the hot water tank 60 and the cold water tank 70, simultaneously.

Referring to FIGS. 3 through 6, the cock 7 mentioned above may include a sensor 710 to generate a discharge signal so as to selectively open the discharge valves 91, 92, and 93. The discharge lever 4 may be operated by a pushing and/or a pulling force. The discharge lever 4 may be operated by pushing toward a back side of the drinking water supply device 1 and/or pulling toward a front side of the drinking water supply device 1, which may be a reverse direction of the pushing.

When the pushing force or the pulling force is applied to the discharge lever 4, a predetermined portion of the discharge lever may press a switch 712 of the sensor 710 and generate a discharge signal in the sensor 710. The user may adjust the electric discharge lever 4 generating the discharge signal of the sensor 710 in a pushing direction or a pulling direction so as to discharge drinking water.

A portion of the discharge lever 4 may be formed to press the switch 712 provided in the sensor 710 along a movement of the discharge lever 4. For example, when the pushing force or the pulling force is applied to one longitudinal end of the discharge lever 4, another end of the discharge lever 4 may press the switch 712 of the sensor 710. Accordingly, discharging of the drinking water may be facilitated along the pushing or pulling force with respect to the discharge lever 4 using only one sensor 710.

The discharge lever 4 may include a manipulation unit or manipulator 411 manipulated by the user and a contact unit or contact 422 and 423 formed to selectively contact with the sensor 710.

The cock 7 may include a cock housing 701 and a spring installing portion 730 provided in the cock housing 701. A spring 720 may be provided between one side of the contact 422 and 423 and the spring installing portion 730. The spring installing portion 730 may include a rod 732 formed to move according to the user's manipulation of the discharge lever 4 vertically and a supporting portion 731 to support the rod 732. The spring 720 may be provided around the rod 732. The spring 720 may be arranged between a spring supporting portion 712' provided in the rod 732 and a top surface 701' of the cock housing 701. A discharge hole 702 to discharge drinking water outside may be formed in a bottom surface of the cock housing 701. Accordingly, the spring 720 may be formed to provide a restitution force to the discharge lever 4 when the discharge lever 4 is manipulated.

The manipulator 411 may be provided in or at one end 410 of the discharge lever 4 and the contact 422 and 423 may be provided in or at another end 420 of the discharge lever 4. For example, the discharge lever 4 may be formed in a "]" shape and the manipulator 411 may be longer than the contact 422 and 423. The contact 422 and 423 may include a first contact 422 to press the switch provided in the sensor 710 when the pushing force is applied to the manipulator 411 and a second contact 423 to press the switch 712 provided in the sensor when the pulling force is applied to the manipulator 411. Once the pushing force is applied to the manipulator 411, the sensor 710 may generate a discharge signal through the first contact 422. When the pulling force is applied to the manipulator 411, the sensor 710 may generate a discharge signal through the second contact 423.

Figure 5:
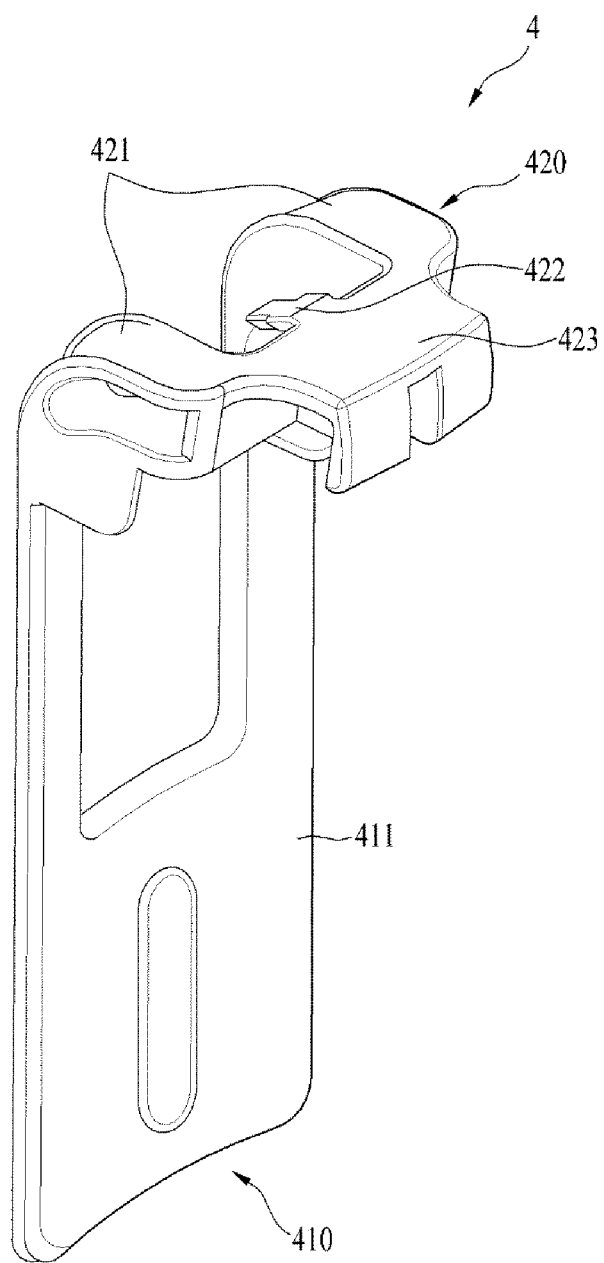
FIG. 5 is a view of the lever shown in FIG. 4A.

Referring to FIG. 5, a pair of supporting frames 421 that extends from both traverse ends of the manipulator 411 may be provided in the other end 420 of the discharge lever 4. The supporting frames 421 may be spaced apart a preset distance from each other in a width direction. The first contact 420 and the second contact 430 may be provided between the pair of the supporting frames 421. The first contact 422 may be projected backwards and the second contact 423 may be projected forwards between the supporting frames. For example, the first contact 422 may be arranged between the pair of the supporting frames 421 and the second contact 423 may be extended forwards from front ends of the supporting frames.

A width of the first contact 422 may be smaller than a width of the space between the supporting frames 421. A width of the second contact 423 may be larger than or equal to the width of the space. The contact 422 and 423 mentioned above may be inclined a preset angle with respect to the manipulator 411. The contact 422 and 423 may be integrally formed with the manipulator 411. The contact 422 and 423, the pair of the supporting frames 421 and the manipulator 411 may be integrally formed with each other.

Figure 6:
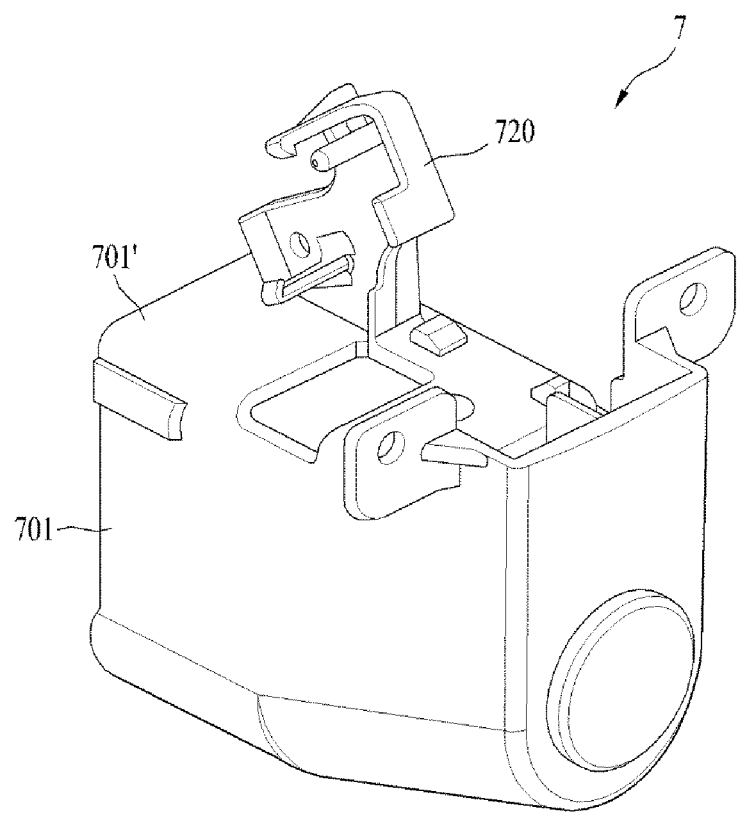
FIG. 6 is a view of the cock shown in FIG. 4A.

Referring to FIG. 6, the cock 7 may include a sensor installing portion 720 for the sensor 710. The sensor 710 mentioned above may be stably installed in the sensor installing portion 720. The sensor installing portion 720 may be extended and inclined a preset angle upwards from the top surface 701' of the cock housing 701. The sensor installing portion 720 may be inclinedly projected upwards from the top surface 701' of the cock housing 701. Accordingly, the sensor 710 may be inclinedly installed in the sensor installing portion 720 with a front end higher than a rear end. The sensor 710 may be inclinedly installed in the sensor installing portion 720 to locate the front end of the sensor 710 higher than the rear end to facilitate contact of the first contact 422 or the second contact 423 with the switch 712 of the sensor 710 by the user's back-and-forth manipulation of the discharge lever 4.

Figure 4B:
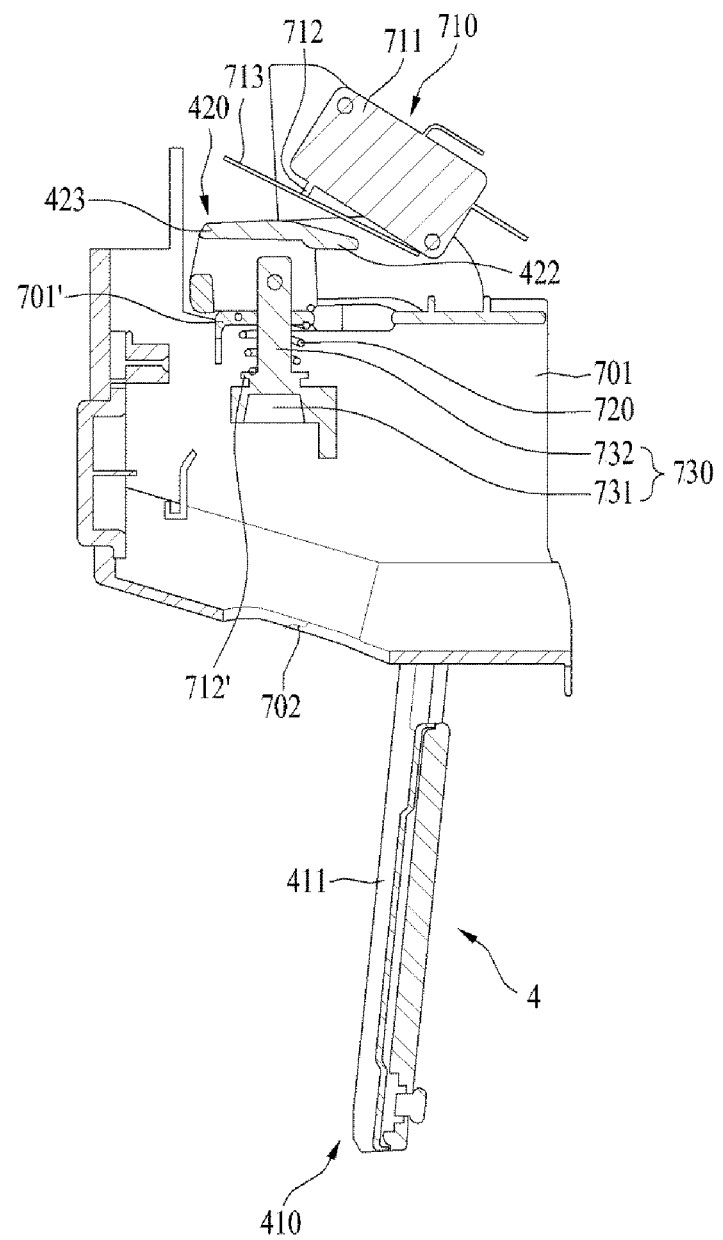
FIG. 4B is a sectional view of the cock and the lever of FIG. 4A.

Referring to FIG. 4A, the sensor 710 may include a sensor housing 711, a switch 712 projected from the sensor housing 711 to input a signal there through and a leaf spring material 713 covering a free end of the switch 712. The sensor housing 711 may define an exterior appearance of the sensor 710 and may be in a rectangular parallelepiped shape. The switch 712 may be projected from a lower surface of the sensor housing 712. The switch 712 may be projected downwards from the sensor housing 711. The leaf spring member 713 may be extended more forwards than a front end of the sensor housing 711. The leaf spring member 713 may be extended at a preset angle with respect to the lower surface of the sensor housing 711.

Accordingly, the switch 712 may be provided between the sensor housing 711 and the leaf spring member 713. The first contact 422 and the second contact 423 may be formed to press the switch 712 through the leaf spring member 713. The first contact 422 may be provided in a region overlapped with the sensor 710 along a longitudinal direction of the cock 7. The second contact 423 may be provided in a region not overlapped with the sensor along the longitudinal direction of the cock 7.

Before the discharge lever 4 is manipulated, the first contact 422 and the sensor 710 may be distant or spaced from each other along the longitudinal direction of the cock 7 and provided in the region overlapped with the sensor 710. The second contact 423 and the sensor 710 may be provided along the longitudinal direction of the cock 7, not overlapped with each other. With such an arrangement, the first contact 422 or the second contact 423 may push the leaf spring member 713 and the leaf spring member 713 may press the switch 712 when the pushing or pulling force is applied to the manipulator 411 of the discharge lever 4.

When the user applies the pushing force to the manipulator 411 of the discharge lever 4, the first contact 422 may press the switch 712 of the sensor 710 through the leaf spring member 713. When user applies the pulling force to the manipulator 411 of the discharge lever 4, the second contact 423 may press the switch 712 of the sensor 710 through the leaf spring member 713, When the manipulator 411 is pulled to a preset angle or more from an initial location, a rear end 423' of the second contact 423 may contact the top surface 701' of the cock housing 701 and the pulled state of the manipulator 411 may then be fixed. The second contact 423 may keep pressing the switch 712 of the sensor 710 such that the drinking water may be discharged continuously until the user returns the manipulator 411 to an initial location.

Figure 7:
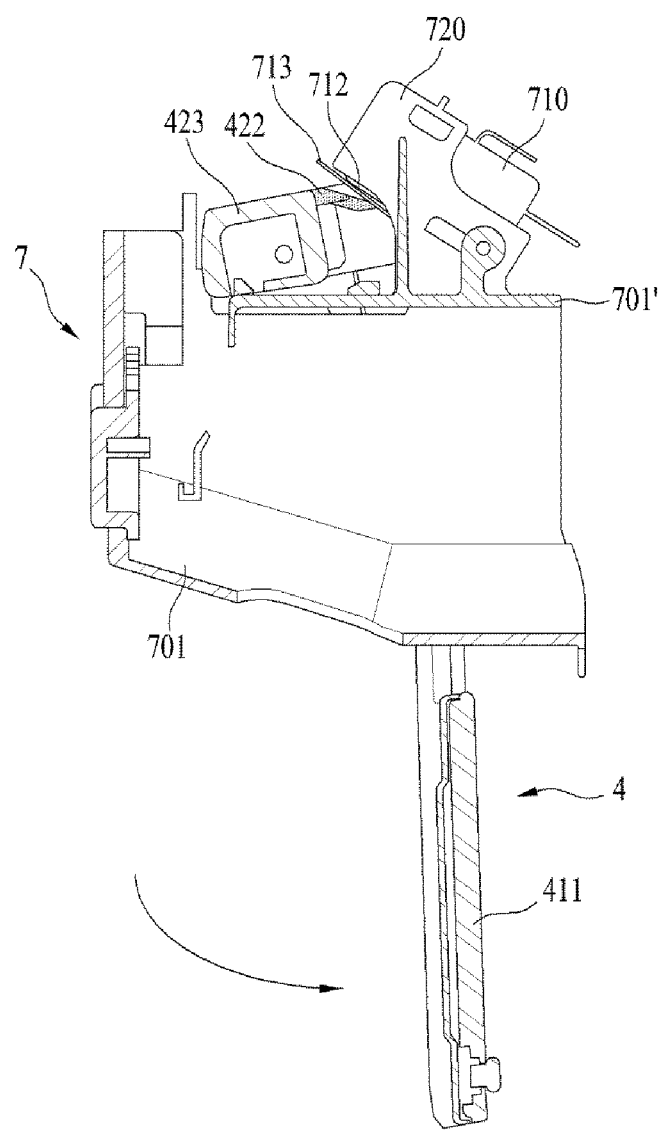
FIG. 7 is a view illustrating a state where a pushing force may be applied to the lever shown in FIG. 4A.

Referring to FIG. 7, the pushing force may be applied to the discharge lever 4 by the user to discharge drinking water. The user may apply the pushing force to the manipulator 411 of the discharge lever 4 in a direction of an arrow shown in FIG. 7. The first contact 422 may move upwards in a state where the lower surface of the second contact 423 may be supported by the top surface 701' of the cock housing 701.

The first contact 422 moving upwards may press the switch 712 through the leaf spring member 713. When the switch 712 is pressed, a discharge signal may be sent to the controller (C) from the sensor 710. The controller (C) may control one of the discharge valves 91, 92, and 93. The controller (C) may open one of the discharge valves 91, 92, and 93 based on determination of whether the discharge signal input by the user is for discharging purified water, cold water, or hot water.

Figure 8:
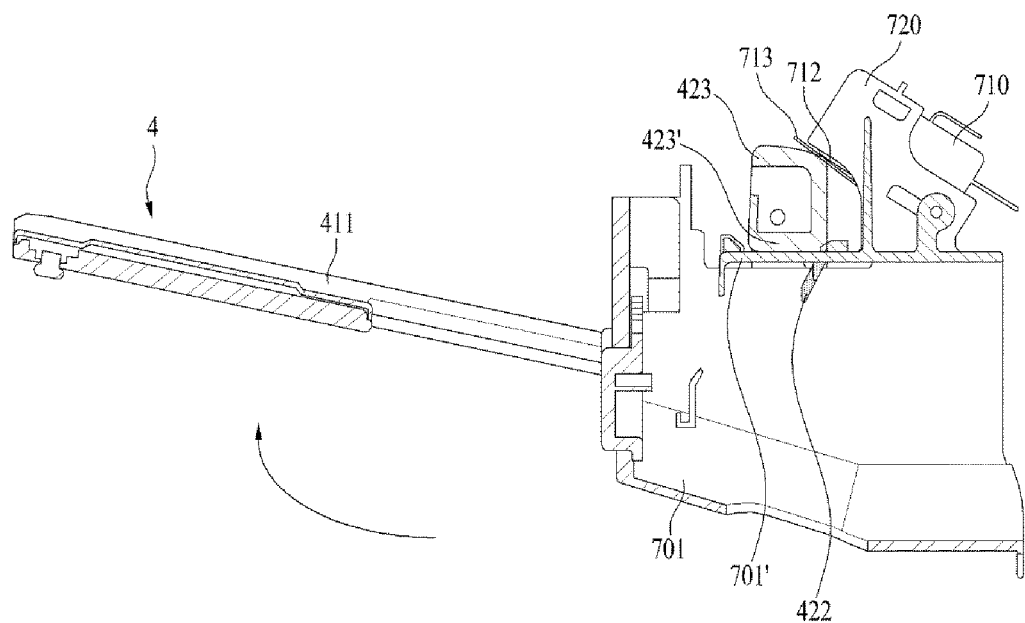
FIG. 8 is a view illustrating state where a pulling force may be applied to the lever shown in FIG. 4A.

Referring to FIG. 8, the pulling force may be applied to the discharge lever 4 to discharge drinking water. To discharge drinking water, the user may apply the pulling force to the manipulator 411 of the discharge lever 4 in a direction of an arrow shown in FIG. 8. The second contact 423 may moves upward while the first contact 422 vertically rotates downwards. The second contact 423 moving upwards may press the switch 712 through the leaf spring member 713 provided in the sensor 710. When the switch 712 is pressed, the discharge signal is sent to the controller (C) from the sensor 710, and the controller (C) may open one of the discharge valves 91, 92, and 93. The controller (C) may open one of the discharge valves 91, 92, and 93 based on determination of whether the discharge signal input by the user is for discharging purified water, cold water, or hot water.

Referring to FIG. 8, a rear surface of the second contact 423 may surface-contact the top surface 701' of the cock housing 701 when the manipulator 411 is pulled to a preset angle or more. Accordingly, the discharge lever 4 may not be returned to an initial state or location, even if the restitution of the spring 720 mentioned above is applied to the discharge lever 4 when the user releases the manipulator 411. Even though the user releases the manipulator 411 after the manipulator 411 is pulled to a preset angle, for example, 90~110 degrees, from the initial location, the manipulator 411 may not return to the initial location, and drinking water may then be constantly discharged.

The initial location of the manipulator 411 may refer to a location in which drinking water is not discharged by the user's pushing or pulling with respect to the manipulator 411. To stop the discharging of the drinking water, the user may have to return the manipulator 411 to the initial location by pushing. The user may discharge drinking water from the drinking water supply device by manipulating the electric discharge lever 4 in a back-and-forth direction.

Figure 9:
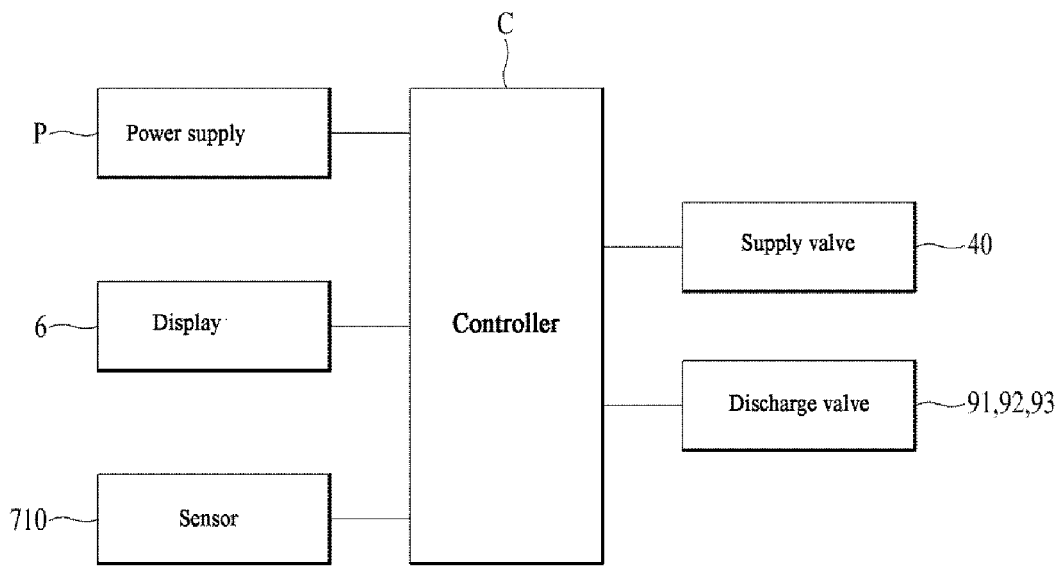
FIG. 9 is a block diagram illustrating relationships between components provided in the drinking water supply device in accordance with an embodiment.

Referring to FIG. 9, the drinking water supply device 1 may include a power supply unit (P) and the controller (C). The power supply unit (P) may supply electric power to the drinking water supply device 1 and may be electrically connected to the controller (C). The controller (C) may receive a signal from the display 6 and the sensor 710 mentioned above. The controller (C) may be electrically connected with the display 6 and the sensor 710.

The controller (C) may be electrically connected with the supply valve 40 and the discharge valves 91, 92, and 93 to control those components. For example, the user may select purified water, hot water, or cold water via the display 6, which may be a touch panel. The user may select the purified water, hot water, or cold water displayed on the display 6 and then manipulate the discharge lever 4 mentioned above to discharge only a selected drinking water.

The supply valve 40 may be selectively opened based on a drinking water discharge signal input by the user. For example, the controller (C) may open the supply valve 40 based on a discharge signal to discharge a drinking water type, such as, e.g., purified water, cold water, and hot water. The selected drinking water may be discharged along a discharge flow path configured with the fourth flow path 54, the fifth flow path 55, and the sixth flow path 56 according to a control for opening the supply valve 40, as shown in FIG. 3. When manipulated by the user, the discharge lever 4 may press the switch 712 provided in the sensor 710. The sensor may generate a drinking water discharge signal according to the manipulation of the discharge lever 4.

The controller (C) may open one of the discharge valves 91, 92, and 93 based on the drinking water discharge signal sent from the sensor 710. When the user selects cold water on the display 6, the controller (C) may open the cold water discharge valve 92 based on the drinking water discharge signal sent from the sensor 710. When the user selects hot water on the display 6, the controller (C) may open the hot water discharge valve 93 based on the drinking water discharge signal sent from the sensor 710. When selecting to discharge purified water, the user may only manipulate the discharge lever 4 to discharge purified water without inputting a selection to the display 6. Alternatively, the user may manipulate the discharge lever 4 to discharge purified water in a state where no control command is input to the display 6.

The drinking water supply device in accordance with an embodiment may generate discharge signals for both a pushing direction operation mode and a pulling direction operation mode with respect to the electric discharge lever 4 using only one sensor 710.

According to embodiments disclosed herein, a drinking water supply device may have a structure of an electric discharge lever to which an operation method or technical advantages of a mechanical discharge lever may be applied. A drinking water supply device may allow a discharge lever having the structure of the electric discharge lever to be pulled to a preset angle and kept standing so as to discharge drinking water continuously. A drinking water supply device may discharge drinking water through an electric discharge lever pulling force using one sensor.

Embodiments disclosed herein provide a drinking water supply device configured to discharge water based on a pressure of water supplied from a water supply source. The drinking water supply device may include at least one discharge flow path that allows water supplied from the water supply source to flow therein, a discharge valve provided in the at least one discharge flow path, at least one cock provided in an end of the at least one discharge valve, the discharge valve including a sensor that generates a discharge signal to open the at least one discharge valve, a lever coupled to the at least one cock and operated by pushing and pulling, and a controller that controls the at least one discharge valve and the sensor. The discharge signal may be generated in the sensor when a switch of the sensor is pressed by a predetermined region of the lever.

The switch of the sensor may be pressed by the predetermined region of the lever when the lever is pushed or pulled. An end of the lever may be configured to press the switch of the sensor when the lever is pushed or pulled at another longitudinal end thereof. The lever may include a manipulator manipulated by a user and a contact that selectively contacts with the sensor, and the at least one cock may include a cock housing and a spring installing portion provided in the cock housing, a spring being provided between a side of the contact and the spring installing portion. The manipulator may be provided in one end of the lever and the contact is provided in another end of the lever, the contact including a first contact configured to press a switch provided in the sensor when manipulator is pushed, and a second contact configured to press a switch provided in the sensor when the manipulator is pulled.

A pair of supporting frames that extend from both width direction ends of the manipulator may be provided in the other end of the lever. The first contact may extend backwards from a space formed between the pair of the supporting frames, and the second contact may extend forwards from the space. A width of the first contact may be smaller than a width of the space formed between the pair of the supporting frames, and a width of the second contact may be larger than or equal to the width of the space formed between the pair of the supporting frames.

The first contact and the second contact may be inclined a preset angle with respect the manipulator, and the contact and the manipulator may be integrally formed with each other. An upper surface of the second contact may be planar and equal to an upper surface of the pair of supporting frames, and an upper surface of the first contact may be inclined a preset angle with respect to the upper surface of the pair of supporting frames.

The at least one cock may further include a sensor installing portion in which the sensor is installed. The sensor installing portion and the contact may correspond to each other over the cock housing, and the sensor installing portion may extend upwards at a preset angle from a top surface of the cock housing. The sensor may be inclinedly installed in the sensor installing portion so that a front end of the sensor may be higher than a rear end of the sensor.

The sensor may include a sensor housing, a switch projected from the sensor housing for signal input, and a leaf spring member provided to cover a free end of the switch. When the contact presses the leaf spring member, the switch may be pressed by the leaf spring member. The switch may be projected from a lower surface of the sensor housing, and the leaf spring member may extend more forward than a front end of the sensor housing and may extend a preset angle with respect to the lower surface of the sensor housing. The first contact may be provided in a region overlapping the sensor along a longitudinal direction of the cock, and the second contact may be provided in a region not overlapping the sensor along the longitudinal direction of the cock.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drinking water supply device, comprising:
   at least one discharge flow path that allows water supplied from a water supply source to flow therein;
   a discharge valve provided in the at least one discharge flow path;
   at least one cock provided in an end of the at least one discharge flow path, the cock including a sensor that generates a discharge signal to open the at least one discharge valve;
   a lever coupled to the at least one cock and configured to be pushed or pulled; and
   a controller that controls the at least one discharge valve and the sensor,
   wherein the lever includes a manipulator manipulated by a user and a contact that selectively contacts with the sensor, the contact including a first contact configured to press a switch provided in the sensor when the manipulator is pushed and a second contact configured to press a switch provided in the sensor when the manipulator is pulled, and
   wherein the discharge signal is generated in the sensor when a switch of the sensor is pressed by a predetermined region of the lever.

2. The drinking water supply device of claim 1, wherein the switch of the sensor is pressed by the predetermined region of the lever when the lever is pushed or pulled.

3. The drinking water supply device of claim 1, wherein an end of the lever is configured to press the switch of the sensor when the lever is pushed or pulled at another longitudinal end thereof.

4. The drinking water supply device of claim 1, wherein the at least one cock includes a cock housing and a spring installing portion provided in the cock housing, a spring being provided between a side of the contact and the spring installing portion.

5. The drinking water supply device of claim 4, wherein the manipulator is provided in one end of the lever and the contact is provided in another end of the lever.

6. The drinking water supply device of claim 5, wherein a pair of supporting frames that extend from a width direction at an end of the manipulator are provided in the other end of the lever.

7. The drinking water supply device of claim 6, wherein the first contact extends backwards from a space formed between the pair of the supporting frames, and the second contact extends forwards from the space.

8. The drinking water supply device of claim 7, wherein a width of the first contact is smaller than a width of the space formed between the pair of the supporting frames, and a width of the second contact is larger than or equal to the width of the space formed between the pair of the supporting frames.

9. The drinking water supply device of claim 8, wherein the first contact and the second contact are inclined a preset angle with respect the manipulator, and the contact and the manipulator are integrally formed with each other.

10. The drinking water supply device of claim 7, wherein an upper surface of the second contact is planar and equal to an upper surface of the pair of supporting frames, and an upper surface of the first contact is inclined a preset angle with respect to the upper surface of the pair of supporting frames.

11. The drinking water supply device of claim 5, wherein the cock further includes a sensor installing portion in which the sensor is installed.

12. The drinking water supply device of claim 11, wherein the sensor installing portion and the first contact correspond to each other over the cock housing, and the sensor installing portion extends upwards at a preset angle from a top surface of the cock housing.

13. The drinking water supply device of claim 12, wherein the sensor is inclinedly installed in the sensor installing portion so that a front end of the sensor is higher than a rear end of the sensor.

14. The drinking water supply device of claim 13, wherein the sensor includes:
- a sensor housing;
- a switch projected from the sensor housing for signal input; and
- a leaf spring member provided to cover a free end of the switch, wherein, when the contact presses the leaf spring member, the switch is pressed by the leaf spring member.

15. The drinking water supply device of claim 14, wherein the switch is projected from a lower surface of the sensor housing, and the leaf spring member extends more forward than a front end of the sensor housing and extends a preset angle with respect to the lower surface of the sensor housing.

16. The drinking water supply device of claim 15, wherein the first contact is provided in a region overlapping the sensor along a longitudinal direction of the cock, and the second contact is provided in a region not overlapping the sensor along the longitudinal direction of the cock.

17. The drinking water supply device of claim 16, wherein the first contact or the second contact pushes the leaf spring member toward the switch for the leaf spring member to press the switch when the manipulator is pushed or pulled.

18. The drinking water supply device of claim 5, wherein when the manipulator is pulled to a preset angle or more from an initial location, a rear end of the second contact contacts with an upper surface of the cock housing and the manipulator then maintains a pulled state.

19. The drinking water supply device of claim 18, wherein when the manipulator is pulled to the preset angle or more from the initial location, a rear end of the second contact surface-contacts with an upper surface of the cock housing.

20. The drinking water supply device of claim 18, wherein when the manipulator maintains the pulled state, the second contact keeps pressing the switch of the sensor.

* * * * *